United States Patent
Fick et al.

(10) Patent No.: US 6,607,665 B2
(45) Date of Patent: Aug. 19, 2003

(54) FUEL FILTER ELEMENT AND COVER ASSEMBLY

(75) Inventors: Walter J Fick, Kearney, NE (US); Gene W. Brown, Kearney, NE (US); David A. Biere, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 09/907,129

(22) Filed: Jul. 17, 2001

(65) Prior Publication Data

US 2003/0015465 A1 Jan. 23, 2003

(51) Int. Cl.[7] .............................................. B01D 27/00
(52) U.S. Cl. ...................... 210/238; 210/438; 210/450; 210/454; 210/470; 210/488; 210/497.01
(58) Field of Search ................................ 210/234, 315, 210/342, 437, 438, 450, 454, 487, 488, 497.01, 238, 470

(56) References Cited

U.S. PATENT DOCUMENTS

| | | | |
|---|---|---|---|
| 4,836,923 A | | 6/1989 | Popoff et al. ............... 210/232 |
| 5,603,829 A | * | 2/1997 | Baumann ..................... 210/295 |
| 6,015,492 A | | 1/2000 | Popoff et al. ............... 210/238 |
| 6,113,781 A | * | 9/2000 | Popoff et al. ............... 210/234 |
| 6,308,836 B1 | * | 10/2001 | Guichaoua et al. ......... 210/440 |

FOREIGN PATENT DOCUMENTS

| | | | | |
|---|---|---|---|---|
| EP | 1008375 A1 | * | 6/2000 | .......... B01D/29/15 |
| FR | 2762229 A1 | * | 10/1998 | .......... B01D/27/08 |

* cited by examiner

Primary Examiner—Matthew O. Savage
(74) Attorney, Agent, or Firm—Leydig, Voit & Mayer, Ltd.

(57) ABSTRACT

A disposable filter cartridge, in which the entire filter cartridge is disposable. The filter cartridge includes a tubular filter element substantially permanently retained to a lid such that the filter element cannot be removed from the lid without extreme force. The filter element includes a ring of filter media having ends potted in cup shaped end caps. The lid includes a central hub that is inserted through the opening in on of the end caps and ultrasonically deformed or flared radially outward to provide a lip that engages the top end cap for axial retention. The filter element is free floating and can be moved or tilted a small degree axially and can also be freely rotated relative to the lid.

21 Claims, 9 Drawing Sheets

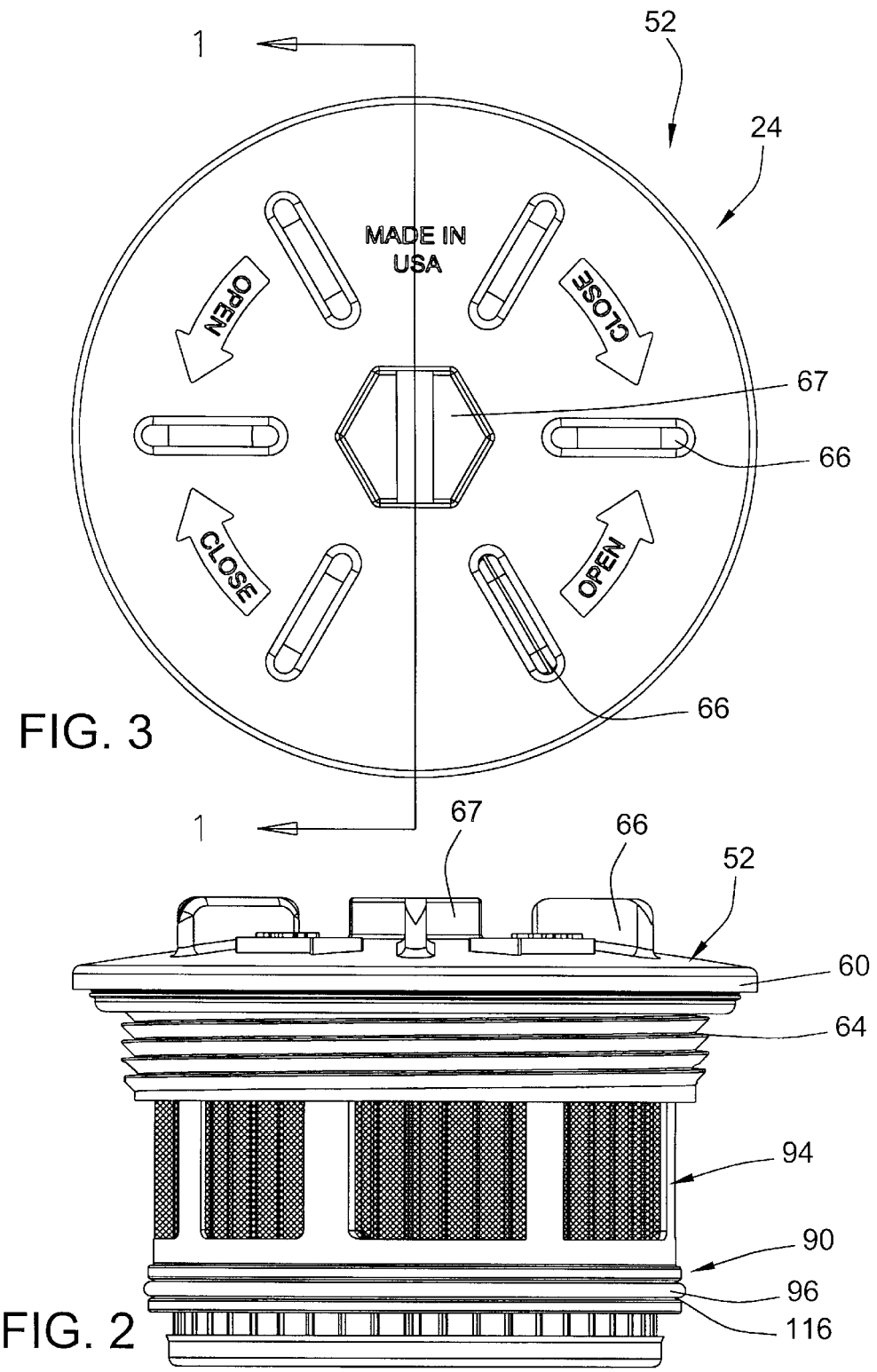

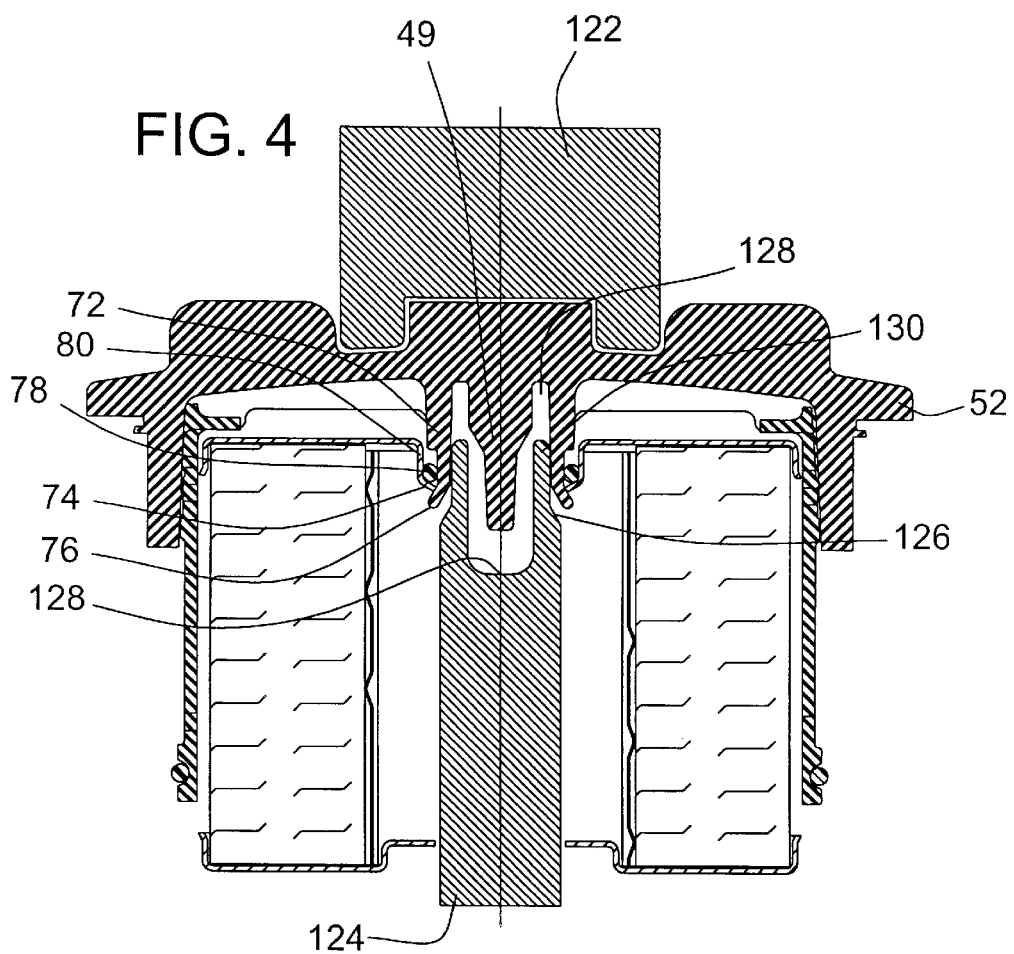

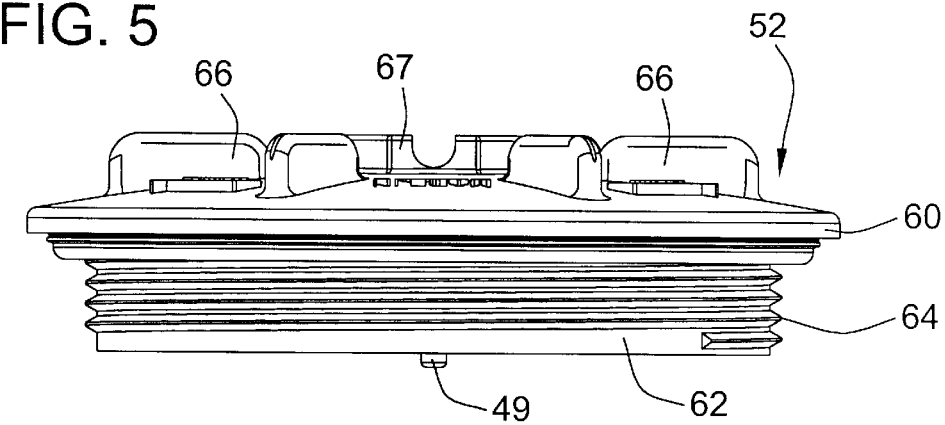
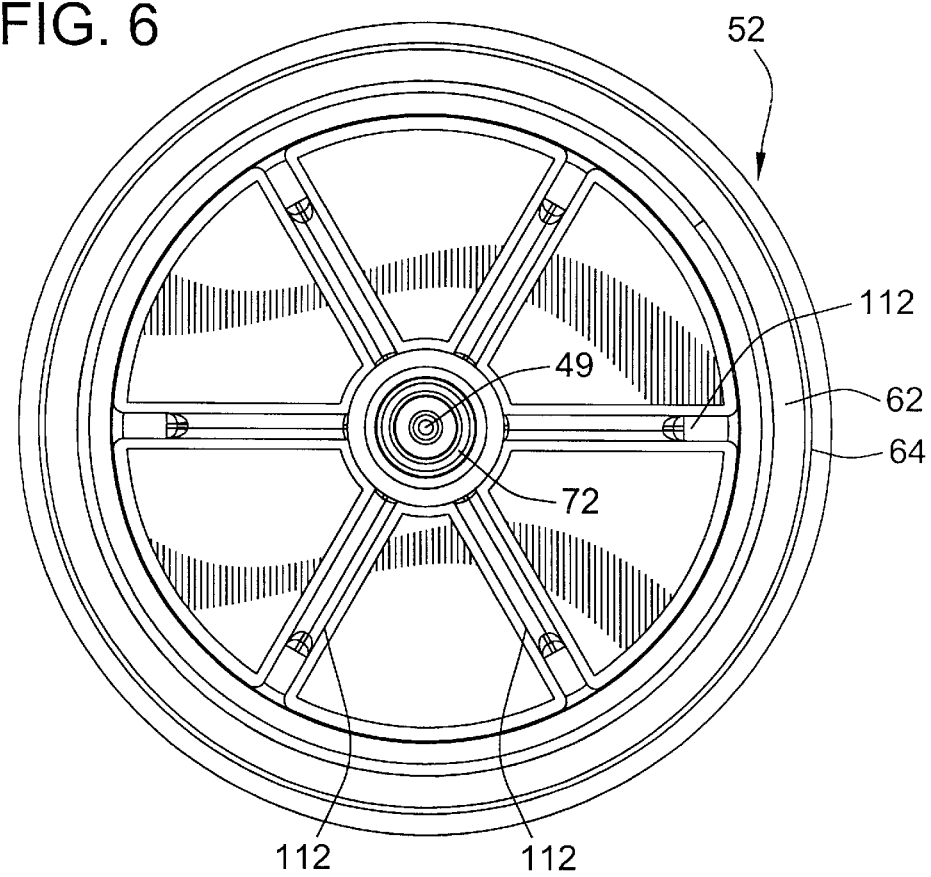

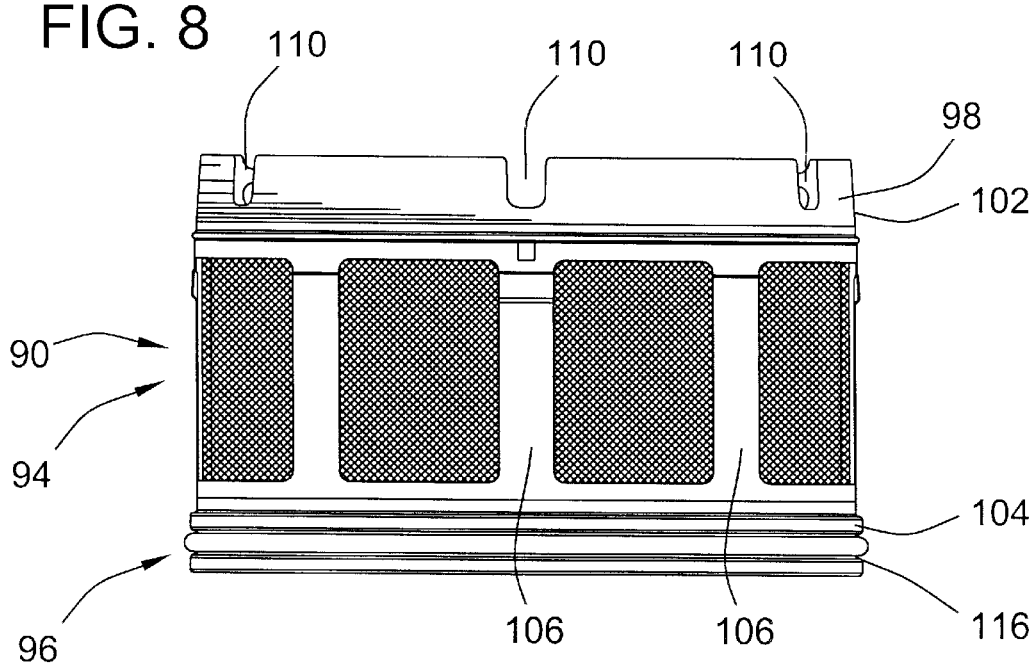
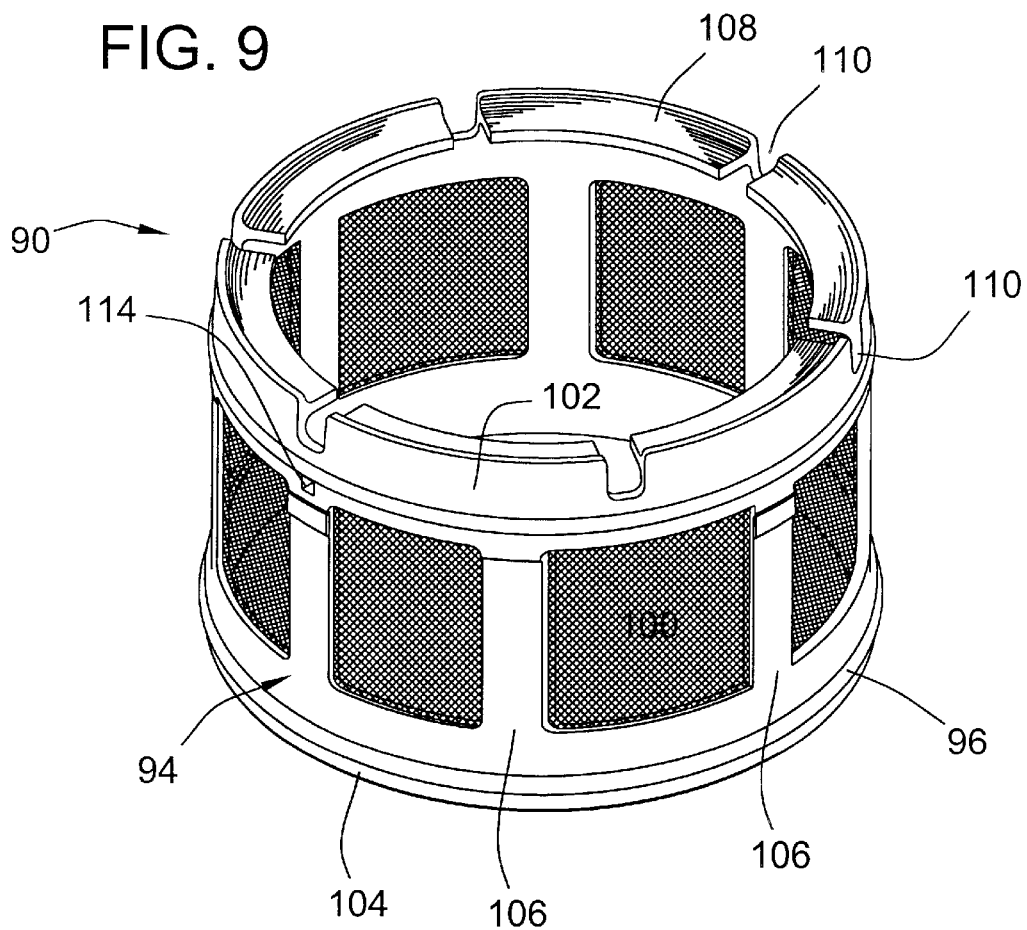

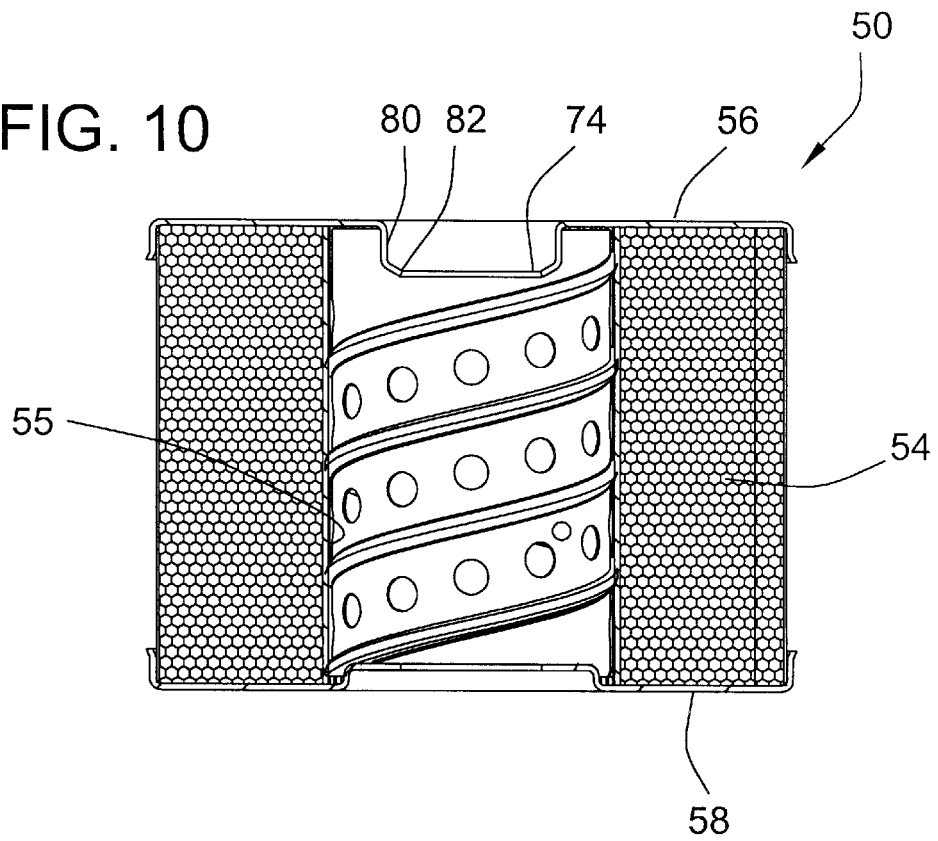

FUEL FILTER ELEMENT AND COVER ASSEMBLY

FIELD OF THE INVENTION

The present invention relates generally to filters and more particularly to fuel filters for filtering particulate impurities from liquid fuels such as diesel or gasoline.

BACKGROUND OF THE INVENTION

Fuel filter assemblies are used in combustion engines for filtering particulate impurities from liquid fuels such as gasoline or diesel. A common form of fuel filter assembly includes a filter cartridge mounted in the filter chamber of a filter housing. The filter element removes particulates and water from the fuel as it travels radially inward through the filter element to the standpipe. The filter cartridge includes a tubular filter element which is situated concentric around a standpipe extending vertically from the base of the filter housing. A valve in the standpipe has open and closed positions to control fuel flow through the fuel filter assembly. The filter cartridge includes an axial projection that depresses and opens the valve when the filter cartridge is installed in the filter housing.

After a certain amount of time the filter media in the filter element tends to collect a large quantity of impurities. To remedy this problem, the filter element is periodically removed from the filter housing, disposed of, and then replaced with a new filter element, typically at scheduled maintenance intervals.

There have been two prior art approaches for facilitating to replacement of the filter element. The first approach has been to replace the filter element but reuse the existing lid as taught by Popoff et al. in U.S. Pat. No. 6,015,492. According to this approach, the filter element is releasably latched to the lid such that the filter element can be removed from the lid and then replaced with a new element. The other approach has been to replace the entire filter cartridge. One attempt demonstrating this second approach is taught by Popoff et al. in U.S. Pat. No. 4,836,923 with the exception that the filter housing in that attempt does not have an actuatable valve in the standpipe. According to this second approach, the filter element is permanently secured to the lid by potting the filter media of the filter element directly to the bottom side of the lid, such that the entire filter cartridge is disposable and replaceable.

There are several problems existing with both approaches. One problem with the first approach is that excessive fuel to skin contact occurs when the mechanic removes the filter element from the lid and replaces it with a new element. Excessive handling of the used filter element is needed for removal and disposal. Another problem with this approach is that a dirty and used outer gasket is left on the lid to be reused for sealing between the cartridge and the filter housing. Undesirable particulates can build up at this location that in turn can cause problems. Furthermore, if the gasket is lost or becomes faulty, fuel leakage can occur between the filter housing and the lid of the filter cartridge. Even when a new gasket is provided with the replacement filter element, there is no guarantee that the mechanic will take the time to throw away the old gasket.

A problem with the second approach in which the entire filter cartridge is disposable as taught by Popoff et al. in U.S. Pat. No. 4,836,923, is that the filter element is potted into the lid which can cause installation, sealing and alignment difficulties. In particular when the filter element is directly potted to the lid, it is difficult to properly position the filter element perfectly concentric with the lid during manufacture. This in turn makes it difficult for the sealing grommet to properly align and seal with the center standpipe due to these and other manufacturing tolerances. This is further complicated by the fact that the helical structure of the threaded connection between the cartridge and housing can cause a slight tilt in the filter cartridge during installation. A further problem with this approach as alluded to above is that there is no valve structure in the standpipe of the housing. Other problems with this second approach are also recognized in the '492 patent.

It is also known to provide an outer strainer basket as part of the filter cartridge that concentrically surrounds the ring of filter media in the filter element. According to this type of cartridge, the strainer basket a plastic member that is integrally molded with the top plastic end cap of the filter element. However, the addition of a strainer basket adds one additional structure which also presents manufacturing tolerance difficulties. In particular, the top plastic end cap of the filter element becomes an extremely complex and costly part to form. Again it is also difficult to properly pot the ring of filter media of the filter element into this top end cap using potting compound. It is easy for the top end cap and therefore the strainer basket to be misaligned or otherwise not concentric with the rest of the filter element including the grommet carried by the bottom end cap of the filter element. Because the strainer basket carries a radial seal gasket which is intended to form a radial seal, this design presents the problem of concentric misalignments between the grommet and the radial seal gasket carried by the basket, which in turn can cause installation difficulties and sealing problems when the filter cartridge is installed into the filter housing.

A further desirable aspect of any fuel filter cartridge is to provide a mechanism that prevents a mechanic or vehicle operator from removing the filter element and replacing the lid without the filter element such that unfiltered fuel can be run through the system. Running unfiltered fuel through an engine could eventually lead to engine damage or failure. All of the difficulties are not easy to resolve, particularly where there is also a desire to provide for an inexpensive filter cartridge.

BRIEF SUMMARY OF THE INVENTION

The present invention is directed towards a novel disposable filter cartridge, in which the entire filter cartridge is disposable. The filter cartridge includes a tubular filter element substantially permanently retained to a lid such that the filter element cannot be removed from the lid without extreme force that would likely break or damage the filter cartridge. The filter element includes a ring of filter media having ends potted in disc shaped end caps. The lid includes a central hub that is inserted through the opening in one of the end caps and ultrasonically deformed or flared radially outward to provide a lip that engages the end cap for axial retention. The filter element is free floating and can be moved a small degree axially and also freely rotated relative to the lid. This provides significant advantages during installation of the filter cartridge into the filter housing where the grommet tightly engages the standpipe and can provide significant frictional resistance. By allowing a controlled amount of play both axially and rotationally, the present invention greatly eases the difficulty of installing the cartridge and ensuring proper installation including proper compression and location of seals and grommets to ensure proper sealing. The lid also integrally provides an axial projection inside of the central hub for actuating the valve in the filter housing standpipe.

Other objects and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 2 is a side view of the fuel filter cartridge shown in FIG. 1.

FIG. 3 is a top view of the fuel filter cartridge illustrated in FIG. 2.

FIG. 4 is a cross section view of a partially assembled fuel filter cartridge, further including the tooling for achieving filter element retention to the lid.

FIG. 5 is a side view of the lid component of the filter cartridge.

FIG. 6 is a bottom view of the lid component shown in FIG. 5.

FIG. 8 is a side view of the basket and o-ring assembly component of the filter cartridge.

FIG. 9 is an isometric of the basket and o-ring assembly component shown in FIG. 8.

FIG. 10 is a cross section view of the filter element component of the filter cartridge.

Figure 1A:
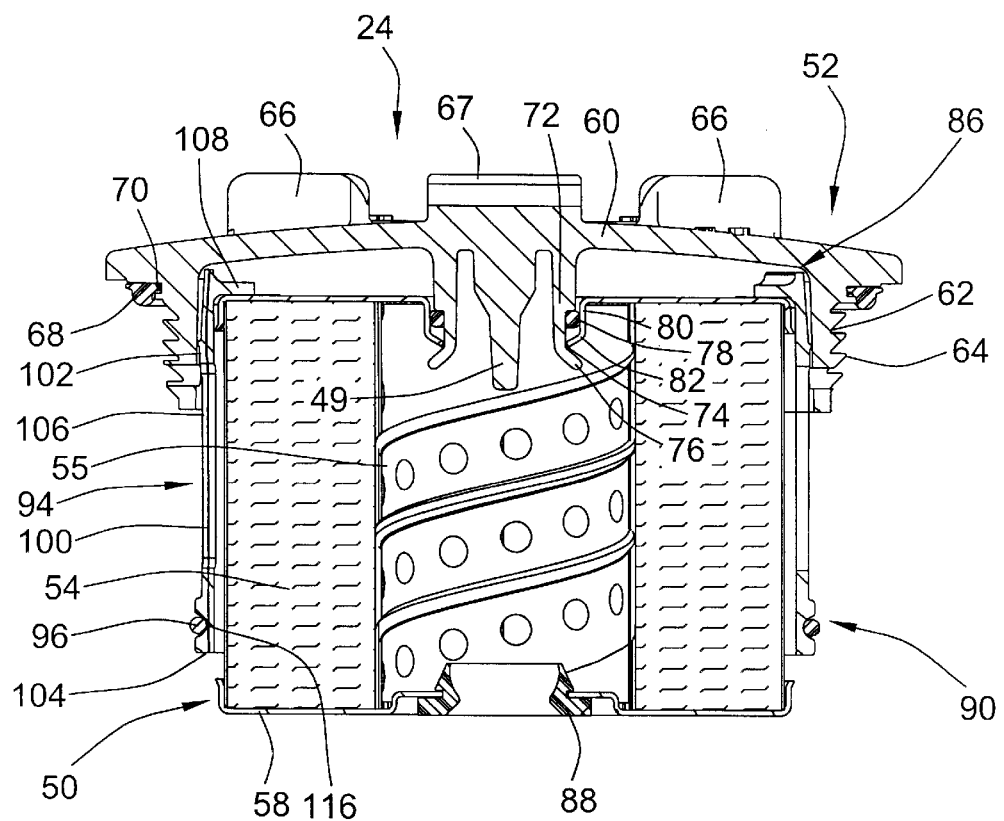
FIG. 1a is a cross section of a fuel filter cartridge according to a first embodiment of the invention taken about line 1—1 of FIG. 3.
Figure 1B:
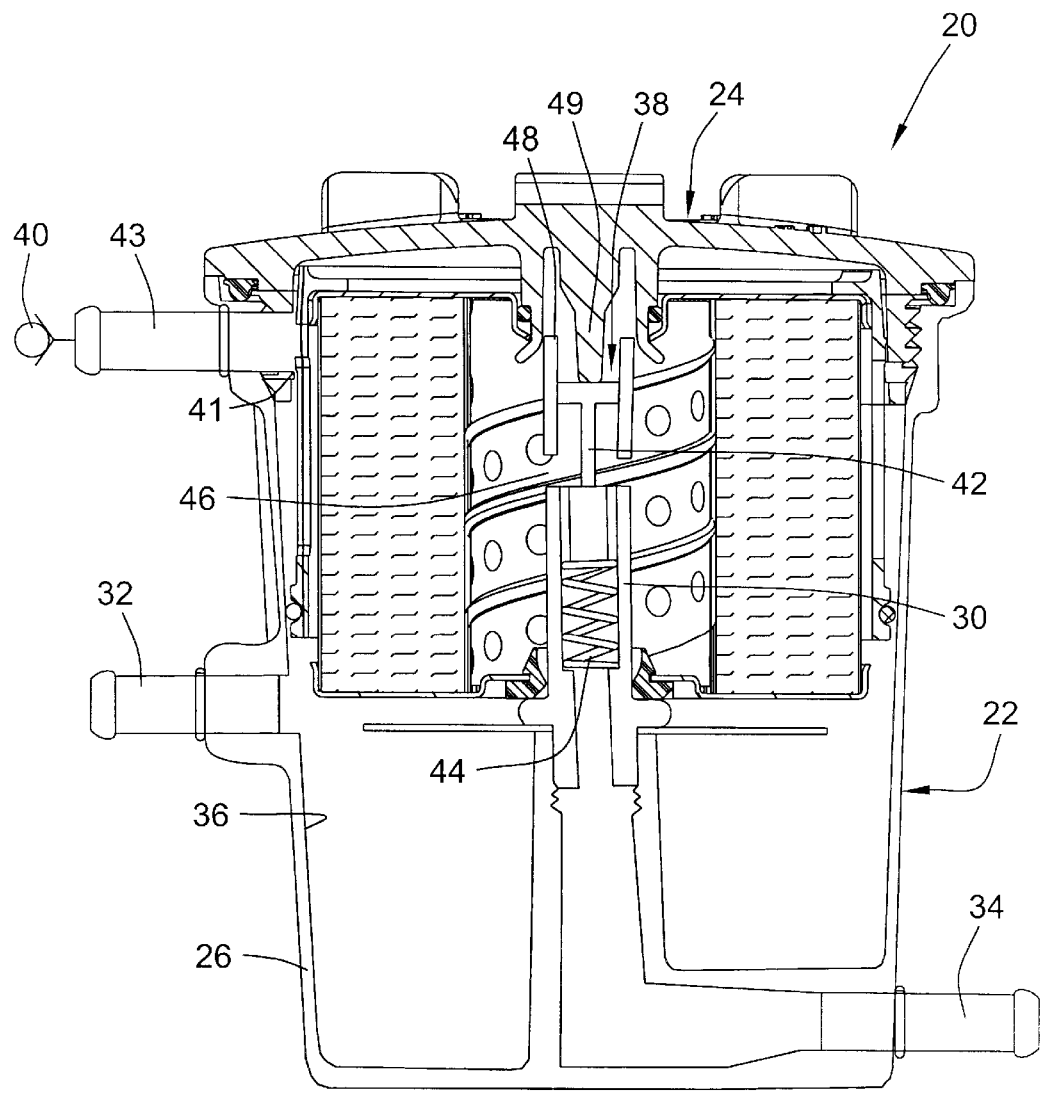
FIG. 1b is a cross section view of the fuel filter cartridge shown in FIG. 1 but illustrated as being mounted in a filter housing.
Figure 7:
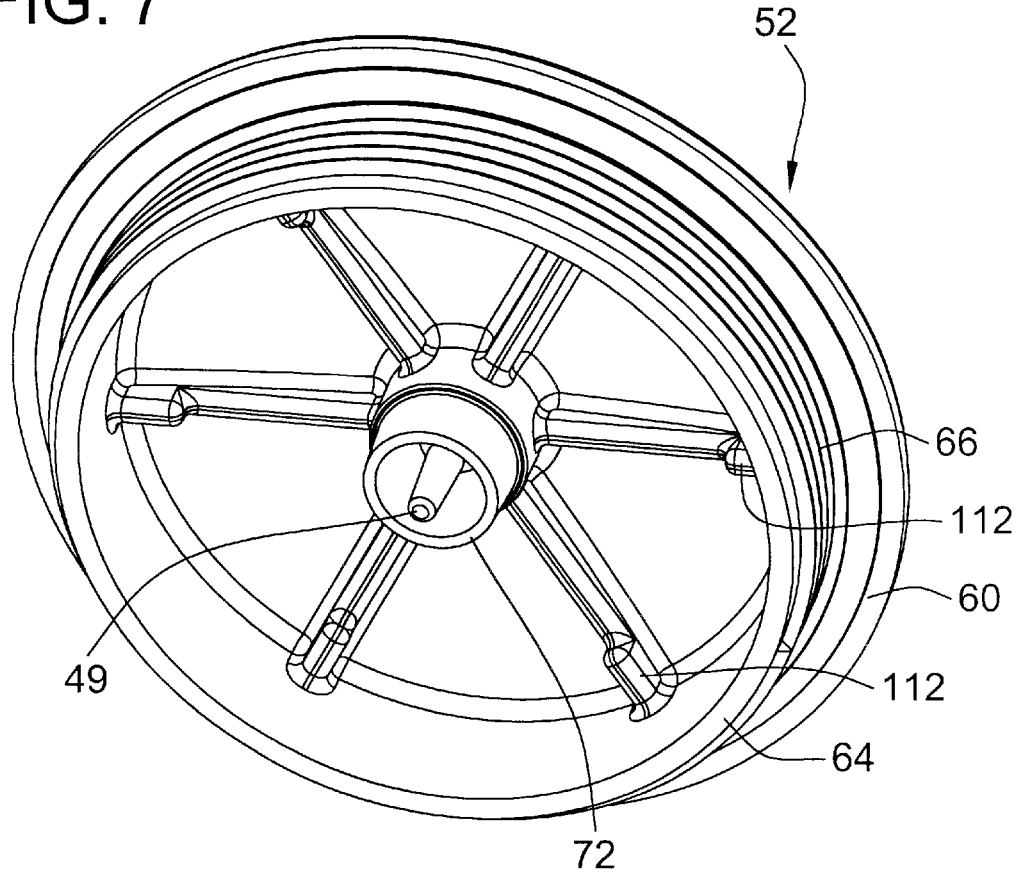
FIG. 7 is an isometric of the lid component shown in FIG. 5.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

For purposes of illustration, a preferred embodiment of the present invention is illustrated as a disposable fuel filter cartridge 24 mounted in a filter housing 22, the combination of which provides a fuel filter assembly 20. The filter housing 22 is rather conventional and includes a bowl 26 having a threaded opening at its top into which the filter cartridge 24 is mounted via interlocking threads. The housing 22 is adapted to be connected to the fuel system of an internal combustion engine for receiving unfiltered fuel via a fuel inlet port 32 and returning filtered fuel for combustion via a fuel outlet port 34. A standpipe 30 extends vertically upward through the center of the bowl 26 and includes an actuatable valve 38 for opening and closing the filter chamber 36 of the bowl 26 to the outlet port 34 depending upon whether or not a filter cartridge 24 has been properly mounted to the filter housing 22. The valve 38 includes a closure element 42 biased by a spring 44 to a closed position for preventing fuel flow into the standpipe 30 through port openings 46. The standpipe 30 also includes an opening 48 at its axial end for receiving an axial projection 49 of the cartridge 24 that axially depresses the closure element 42 against the bias of the spring 44 to allow fuel flow through the port openings 46 past the valve 38 and to the fuel outlet port 34. A check valve or pressure relief valve 40 may also be mounted along the outer periphery of the bowl 26 and connected to the fuel tank for the purpose of relieving excess fuel pressure in the filter chamber 36 in case the filter cartridge 24, standpipe 30 or outlet port 34 is clogged or partially plugged. In this case, the excess fuel relief port 43 to the pressure relief valve 40 is located in a slot 41 in the threads of threaded opening 28 to allow for communication of excess fuel to the port 43.

Now that details of the filter housing 22 have been set forth, attention will be had to the disposable fuel filter cartridge 24. The filter cartridge 24 comprises a tubular filter element 50 secured to a screw on lid 52 in a substantially permanent manner. The filter element 50 includes a ring of filter media 54 such as pleated filter paper, a perforated metal center support tube 55 supporting the inner periphery of the filter media 54, and top and bottom cup shaped end caps 56, 58 that are preferably stamped from moderately thin sheet steel. The ends of the filter media 54 may be potted with conventional potting materials, glued or otherwise secured to the end caps 56, 58.

The lid 52 is preferably molded from relatively rigid plastic material that integrally includes a generally flat or slightly concave plate shaped cover portion 60 and a downwardly depending cylindrical skirt 62. The skirt 62 includes threads 64 that screw into the threaded opening 28 of the housing 22. The top side of the lid 52 includes projecting grips or fins 66 that allow a mechanic to grasp and twist the filter cartridge 24 to allow easy insertion or removal of the filter cartridge 24 without the need for tools. The top side of the lid 52 also integrally includes a slotted hex 67 to allow a wrench or screw driver to be used if necessary to loosen or tighten the filter cartridge 24. The outer peripheral edge of the cover portion 60 extends radially beyond the outer diameter of the skirt 62 to provide a structure that seats against the top edge of the bowl 26. A ring gasket 68 is compressed axially between the bowl and the lid for sealing purposes. The ring gasket 68 is arranged on the lid 52 in the outer corner between the cover portion 60 and the skirt 62 and is preferably retained by a gasket retainer structure 70 integrally formed in the lid 52. The retainer structure 70 may be a flange or groove that interfits with corresponding flange or groove structure on the gasket 68.

The filter cartridge 24 includes a novel substantially permanent retaining mechanism between the filter element 50 and the lid 52. Referring in greater details to the retaining mechanism, a cylindrical or conical hub 72 is integrally formed into bottom side of the lid 52 in a central location. The conical hub 72 extends axially and projects through the central opening 74 in the top end cap 56. The tip of the hub 72 is ultrasonically deformed radially outward to form an outward flared ring portion 76 that engages the hub 72 for axial retention of the filter element 50. A radial seal o-ring gasket 78 is slid over a reduced diameter tip portion of the hub 72 and engages an inner cylindrical peripheral portion 80 of the top end cap 56 to provide a radial seal that prevents unfiltered fuel leakage therebetween. It is important that the o-ring gasket 78 provides a radial seal considering the fact that the cartridge has a free floating feature that would otherwise make it difficult for an axial seal which would require close axial relationship tolerances and axial compression. The innermost edge 82 of the top end cap 56 is bent radially inward providing a seat for axial retention of the gasket 78. Preferably, the innermost edge 82 is beveled or angled downwardly to provide a tip that engages and interlocks with the flared ring portion 76 of the hub 72.

The flared ring portion 76 of the hub 72 is strong and relative rigid such that the retention of the filter element 50 to the lid 52 is substantially permanent meaning that they cannot be separated without undue force such as breaking the lid or a portion thereof or permanently bending the inner edge of the top end cap. This makes the entire filter cartridge 24 disposable and allows for clean removal and installation of a replacement cartridge. The mechanism stays substantially free of mess and fuel during maintenance. The substantially permanent nature also prevents tampering with the filter cartridge which could otherwise allow for unfiltered fuel flow to the engine if the filter element were to be removed.

There are several other aspects and advantages of the particular configuration of this novel retaining mechanism. One aspect is that the lid 52 can provide the axial projection 49 for engaging and depressing the closure element 42 against the action of the spring 44 to move the valve 38 to the open position and allow for fuel flow through the standpipe 30. The axial projection 49 is integrally formed with the lid 42 and arranged in the center of the hub 72 and is longer axially than the hub 72. The axial projection 49 is provided in a straightforward and easy manner via the molding step of the lid 52, and as such, no expensive or complex structures need be provided by the filter element 50 for valve actuation purposes.

A further advantage of the novel retaining mechanism is that the filter element 50 is free floating and can be moved or tilted a small degree relative to the lid 52 due to a small gap 86 between the top end cap 56 and the bottom surface of the lid 52 on the order of a couple hundredths of an inch. One reason this free floating feature is significant is that it is difficult during manufacture to pot the end caps 56, 58 with potting compound and end up with perfect concentric alignment between the opposing end caps 56, 58. Thus, when the top end cap 56 is fitted over and aligned with the hub 72 prior to ultrasonic swaging operations, the result may be a slight offset in the bottom end cap 58 from a true concentric relationship. However, due to the free floating feature the filter element 50 is not radially constrained and can be freely pivoted relative to the lid 52 such that the grommet 88 carried by the bottom end cap 58 fits more easily over the standpipe of the filter housing during installation of the filter cartridge and does not lead a mechanic to believe that he may be cross threading the threads or otherwise forcing or incorrectly installing the cartridge. As such, the rotation and free floating features provide significant advantages during installation of the filter cartridge 24 into the filter housing 22 due to alignment and tightness difficulties between the grommet 88 and the outer surface of the standpipe 80. In particular, the grommet 88 is a relatively stiff but resilient rubber-like member secured to the inner peripheral edge the bottom end cap 58 via an interfitting flange and groove and serves the purpose of preventing unfiltered fuel leakage into the standpipe 30. A very tight fit of the grommet 88 on the standpipe 30 is desired for accomplishing the intended sealing purpose. However, this tight fit presents alignment and installation difficulties for the mechanic. In prior art designs where the filter element 50 is fixed to the lid and/or not rotatable relative thereto, rotational friction and alignment difficulties greatly increase the force necessary for installing the cartridge and can lead to an improperly installed cartridge. The free floating and freely rotating features of the filter element 50 provides a controlled amount of play both axially and rotationally that eases the difficulty of installing the cartridge and ensuring proper compression and location of the grommet 85 and other seals to ensure proper sealing.

The filter cartridge 24 of the first embodiment also includes a strainer basket and O-ring seal assembly 90 for straining excess fuel flow traveling to the relief port 43. This assembly 90 includes an O-ring gasket 96 and a strainer basket 94. The strainer basket 94 comprises a plastic injection molded support frame or cage 98 and a fabric liner 100. The fabric liner 100 has small pores that prevent passage of water, but not fuel, and may be that commercially available under the name REMAY 2024 FABRIC. The liner 100 is embedded in the plastic of the cage 98 such that the components are not separable without first tearing the fabric. The cage 98 includes an upper ring 102 connected to a lower ring 104 by vertical ribs 106. The upper ring 102 includes a radially inward projecting flange 108 that is trapped between the lid 52 and the top end cap 56 for axial retention of the basket and O-ring seal assembly 90. It is a feature that the strainer basket 94 is separate from the lid and the filter element. The filter element 50 being free floating allows for adjustment between the strainer basket 94 and the grommet 88 to allow for easier installation and proper sealing. The strainer basket 94 can be an easily manufactured part and manufacturing tolerances can be much larger in its formation. The novel way of trapping the strainer basket 94 also simplifies the construction while also ensuring ease of installation and proper sealing of the cartridge. The upper ring 102 may also include receiving slots 110 in the flange 108 that interlock with corresponding ribs 112 on the underside of the lid 52. It is a feature that the axial thickness of the flange 108 is about the same or less the axial thickness of the corresponding ribs 112 such it is easy to adapt the filter cartridge 24 for one that has a strainer basket shown in the first embodiment of FIGS. 1–10 or one that does not include a strainer basket as shown in the second embodiment of FIG. 11. The bottom of the ribs 112 also define the end of the gap 86. It may also be desirable to eliminate the ribs 112 and receiving slots 110 to allow for free rotation of the strainer basket 94. A vent hole 114 is also provided in the strainer basket 94 and through the fabric liner 100 for venting undue pressure build up in case the liner is clogged or due to sudden pressure surges. The lower ring 104 includes a gasket receiving groove 116 in which the O-ring gasket 96 is positioned for sealing against the filter housing to prevent unstrained fuel flow to the relief port 43.

A preferred method of assembling the cartridge 24 will now be described. After the individual components of the filter cartridge 24 are formed, assembly of the filter cartridge 24 is accomplished in four steps. The first step is inserting the strainer basket assembly 90 onto the bottom side of the lid 52 positioning the tabs 112 in the receiving slots 110. The second step is positioning the filter element 50 into the strainer basket 94 with the hub 72 being inserted through the central opening 74 in the top end cap 56. It should be noted that prior to this step the radial seal gasket 78 is already positioned over the reduced diameter portion of the hub 72 or alternatively situated on the filter element along cylindrical portion 80. Next, the entire assembly is subjected to an ultrasonic swaging process in which the lid 52 is positioned in a locating nest 122 for alignment and an ultrasonic horn 124 is inserted through the central opening in the bottom end cap 58 to engage the hub 72 and deform the tip of the hub 72 radially outward with conical surface 126 to form the flared out retention ring 76. Ultrasonic swaging process use ultrasonic energy at a localized location to melt the plastic material of the tip end of the hub of the lid, while the tool surface is used to deform the melted plastic into the desired shape. The horn 124 includes a central cavity 128 which easily receives the axial projection 49 to prevent any deformation of that structure and includes a smaller diameter pilot cylinder 130 that is received into a cylindrical groove 132 defined between the axial projection 49 and the hub 72. Once the ultrasonic swaging process is complete, the grommet 88 is secured to the bottom end cap 58.

Figure 11:
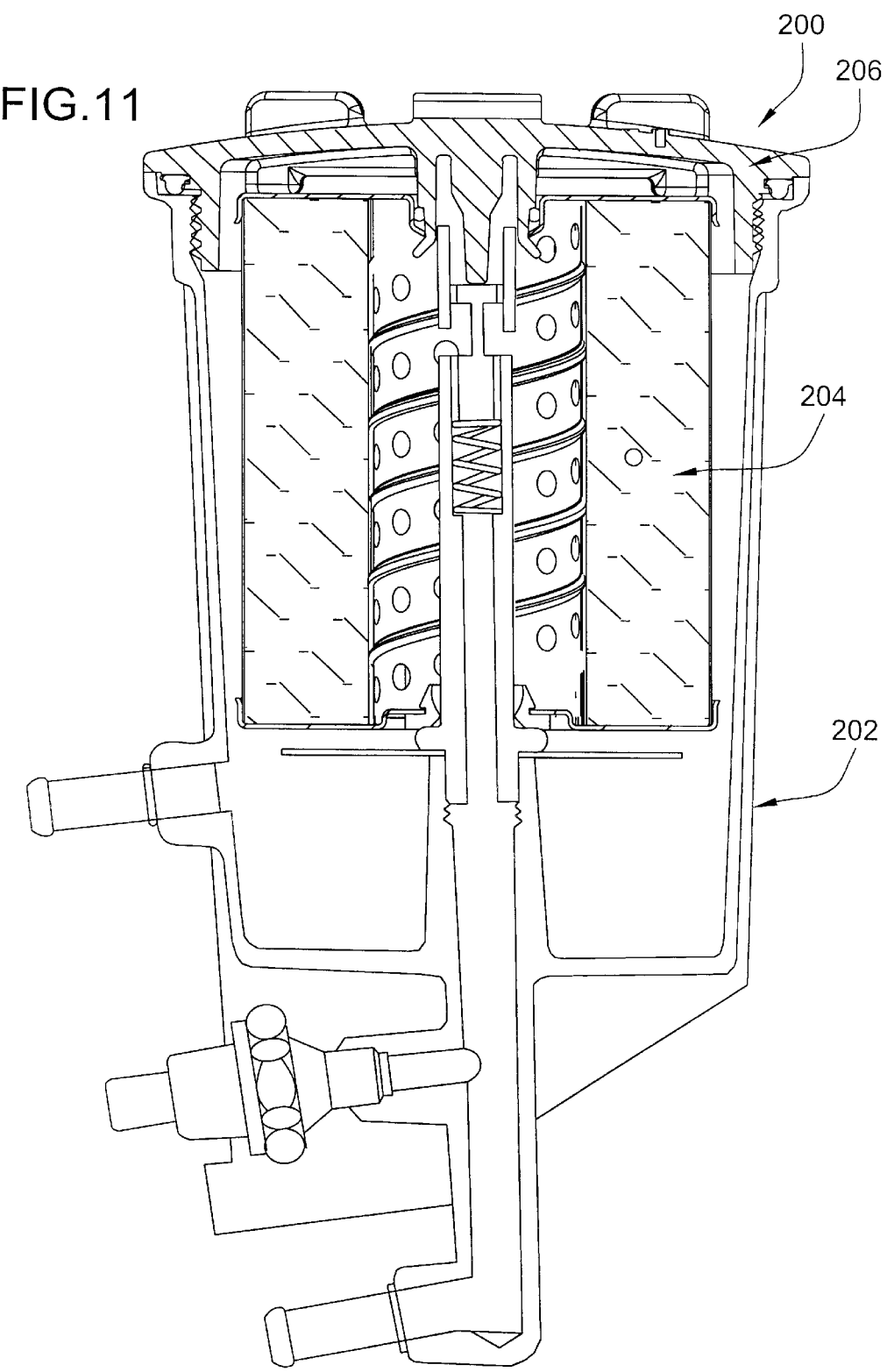
FIG. 11 is a cross section of a fuel filter cartridge according to a second embodiment of the invention illustrated as being mounted in a filter housing.

A filter cartridge 200 according to a second embodiment of the present invention is depicted in FIG. 11. The second embodiment of the filter cartridge 200 is substantially identical to the filter cartridge 24 of the first embodiment with the primary exception being the strainer basket assembly which is absent in the second embodiment. In this second embodiment, the filter housing 202 does not have the provision of the relief port 43 and therefore there is no need to strain the fuel. The only other notable distinctions in this embodiment are the size and dimensions of the cartridge 24 which have been adapted to fit the particular filter housing 202. Otherwise, this cartridge 200 is formed by the same process in which the filter element 204 is retained to the lid 206.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A fuel filter cartridge for insertion to a filter housing, the filter housing comprising a bowl and a standpipe, the standpipe extending in a central location within the bowl, the fuel filter cartridge comprising:

a tubular filter element having a first and second openings at opposing ends, the second opening adapted to receive the standpipe when the fuel filter cartridge is inserted into the filter housing;

a seal disposed at the second opening adapted to engage and seal against the standpipe when the fuel filter cartridge is inserted into the filter housing, wherein the seal extends radially inward past the filter element to provide an exposed lip for engaging the standpipe;

a lid adapted to be mounted to the filter housing, the lid having a central tubular hub projecting into the first opening that excludes any axial slots formed there through, the hub being deformed with an outwardly flared end, the outwardly flared end extending radially beyond the central opening retaining the tubular filter element to the lid; and wherein the outwardly flared end of the hub substantially permanently retains the filter element to the lid such that the tubular filter element is not removable, the outwardly flared end being sufficiently rigid and inflexible such that the outwardly flared end cannot be reduced to a smaller size than the first opening.

2. The fuel filter cartridge of claim 1 wherein the filter element comprises a ring of filter media and first and second end caps secured to opposing ends of the ring of filter media.

3. The fuel filter cartridge of claim 1 wherein the tubular hub is a, cylindrical tubular member of rigid, unyielding plastic material, said outwardly flared end being integral with the cylindrical tubular member formed through radially outward deformation of the plastic material of the cylindrical tubular member.

4. The fuel filter cartridge of claim 1 further comprising a ring gasket arranged between the hub and the tubular filter element.

5. A fuel filter cartridge for insertion to a filter housing, the filter housing comprising a bowl and a standpipe, the standpipe extending in a central location within the bowl, the fuel filter cartridge comprising:

a tubular filter element having a first and second openings at opposing ends, the second opening adapted to receive the standpipe when the fuel filter cartridge is inserted into the filter housing;

a seal disposed at the second opening adapted to engage and seal against the standpipe when the fuel filter cartridge is inserted into the filter housing; and a lid adapted to be mounted to the filter housing, the lid having a central hub projecting into the first opening that excludes any axial slots formed there through, the hub having an enlarged end extending radially beyond the central opening retaining the tubular filter element to the lid;

wherein the hub is a, cylindrical tubular member of rigid, unyielding plastic material, said enlarged end being integral with the cylindrical tubular member formed through radially outward deformation of the plastic material of the cylindrical tubular member;

wherein the hub is cylindrical having first and second cylindrical portions, the first cylindrical portion projecting axially from the lid, the second cylindrical portion projecting axially from the first cylindrical portion, the enlarged end projecting radially outward from the second cylindrical portion; and wherein the second cylindrical portion has a smaller diameter than the first cylindrical portion forming a shoulder for retaining the ring gasket between the shoulder and an axially outer peripheral portion surrounding the first opening of the filter cartridge.

6. The fuel filter cartridge of claim 1 further comprising a valve actuating projection unitary with the lid projecting axially from the lid generally concentric within the hub, the valve actuating projection for actuating a fuel valve in the standpipe, the valve actuating projection adapted to actuate the fuel valve when the fuel filter cartridge is installed on the filter housing.

7. The fuel filter cartridge of claim 1 wherein the tubular filter element is retained in such a way by the outwardly flared end such that the filter element is free floating with a limited range of axially and angular movement relative to the lid.

8. The fuel filter cartridge of claim 1 wherein the lid comprises a cover portion and a cylindrical skirt, the cover portion adapted to enclose the bowl, the cylindrical skirt depending axially from the cover portion, the cylindrical skirt including threading for mounting the fuel filter cartridge to the filter housing.

9. The fuel filter cartridge of claim 8 further comprising a ring gasket carried by the lid between the cylindrical skirt and the cover portion for sealing against the filter housing.

10. The fuel filter cartridge of claim 8 further comprising means on the lid for facilitating screwing of the fuel filter on and off the filter housing.

11. A fuel filter cartridge for insertion to a filter housing, the filter housing comprising a bowl and a standpipe, the standpipe extending in a central location within the bowl, the fuel filter cartridge comprising:

a tubular filter element having a first and second openings at opposing ends, the second opening adapted to receive the standpipe when the fuel filter cartridge is inserted into the filter housing;

a seal disposed at the second opening adapted to engage and seal against the standpipe when the fuel filter cartridge is inserted into the filter housing;

a lid adapted to be mounted to the filter housing, the lid having a central hub projecting into the first opening, the hub having an enlarged end extending radially beyond the central opening retaining the tubular filter element to the lid; and a strainer assembly comprising a strainer basket and a ring seal, the strainer basket comprising a cylindrical cage extending axially between first and second ends, the cylindrical cage supporting a cylindrical strainer liner extending between first and second ends, the first end including a radially inward projecting flange sandwiched between the lid and the tubular filter element for retention of the strainer basket, the ring seal provided at the second end and adapted to engage the bowl.

12. A fuel filter cartridge for insertion to a filter housing, the filter housing comprising a bowl and a standpipe, the bowl having two fuel ports, the standpipe being connected to one of the ports and extending axially in a central location within the bowl, the standpipe including valve having a closed position for preventing fuel flow between the two ports and an open position for allowing fuel flow between the two ports, the fuel filter cartridge comprising:

a tubular filter element comprises a ring of filter media and first and second end caps secured to opposing ends of the ring of filter media, the first and second end caps defining first and second openings, respectively, the second opening adapted to receive the standpipe when the fuel filter cartridge is inserted into the filter housing;

a seal carried by the second end cap surrounding the second opening, the seal adapted to engage and seal against the standpipe when the fuel filter cartridge is inserted into the filter housing;

a lid adapted to be mounted to the filter housing, the lid having a central tubular hub projecting axially into the first opening that excludes any axial slots formed there through, the hub having an enlarged end extending radially beyond the central opening for engaging the first end cap to retain the tubular filter element to the lid, the lid further comprising a valve actuating projection unitary with the lid projecting axially within the hub, the valve actuating projection adapted to actuate the fuel valve when the fuel filter cartridge is installed on the filter housing; and a ring gasket on the hub, wherein the hub defines a shoulder axially spaced from the enlarged end and a recess surface extending axially from the shoulder to the enlarged end trapping the ring gasket.

13. The fuel filter cartridge of claim 12 wherein the tubular hub is a, cylindrical tubular member of rigid, unyielding plastic material, said enlarged end being integral with the cylindrical tubular member formed through radially outward deformation of the plastic material of the cylindrical tubular member.

14. The fuel filter cartridge of claim 12 wherein the tubular filter element is retained in such a way by the enlarged end such that the filter element is free floating with a limited range of axially and angular movement relative to the lid.

15. The fuel filter cartridge of claim 12 wherein the tubular filter element is substantially permanently secured to the lid such that both the lid and tubular filter element are disposed and replaced together.

16. The fuel filter cartridge of claim 12 wherein the lid comprises a cover portion and a cylindrical skirt, the cover portion adapted to enclose the bowl, the cylindrical skirt depending axially from the cover portion, the cylindrical skirt including threading for mounting the fuel filter cartridge to the filter housing.

17. The fuel filter cartridge of claim 16 further comprising a ring gasket carried by the lid between the cylindrical skirt and the cover portion for sealing against the filter housing.

18. The fuel filter cartridge of claim 16 further comprising means on the lid for facilitating screwing of the fuel filter on and off the filter housing.

19. A fuel filter cartridge for insertion to a filter housing, the filter housing comprising a bowl and a standpipe, the bowl having two fuel ports, the standpipe being connected to one of the ports and extending axially in a central location within the bowl, the standpipe including valve having a closed position for preventing fuel flow between the two ports and an open position for allowing fuel flow between the two ports, the fuel filter cartridge comprising:

a tubular filter element comprising a ring of filter media and first and second end caps secure to opposing ends of the ring of filter media, the first and second end caps defining first and second openings, respectively, the second opening adapted to receive the standpipe when the fuel filter cartridge is inserted into the filter housing;

a seal carried the second end cap surrounding the second opening, the seal adapted to engage and seal against the standpipe when the fuel filter cartridge is inserted into the filter housing, wherein the seal extends radially inward from the filter element to provide an exposed lip for engaging the standpipe; and a lid adapted to be mounted to the filter housing, the lid having a central tubular hub projecting axially into the first opening that excludes any axial slots formed there through, the hub having an enlarged end extending radially beyond the central opening for engaging the first end cap to retain the tubular filter element to the lid, the lid further comprising a valve actuating projection unitary with the lid projecting axially within the hub, the valve actuating projection adapted to actuate the fuel valve when the fuel filter cartridge is installed on the filter housing;

wherein the tubular hub is a, cylindrical tubular member of rigid, unyielding plastic material, said enlarged end being integral with the cylindrical tubular member formed through radially outward deformation of the plastic material of the cylindrical tubular member;

wherein the hub has first and second cylindrical portions, the first cylindrical portion projecting axially from the lid, the second cylindrical portion projecting axially from the first cylindrical portion, the enlarged end projecting radially outward from the second cylindrical portion; and wherein the second cylindrical portion has a smaller diameter than the first cylindrical portion forming a shoulder for retaining a ring gasket between the shoulder and an axially outer peripheral portion surrounding the first opening of the filter cartridge.

20. A fuel filter cartridge for insertion to a filter housing, the filter housing comprising a bowl and a standpipe, the bowl having two fuel ports, the standpipe being connected to one of the ports and extending axially in a central location within the bowl, the standpipe including valve having a closed position for preventing fuel flow between the two ports and an open position for allowing fuel flow between the two ports, the fuel filter cartridge comprising:

a tubular filter element comprises a ring of filter media and first and second end caps secured to opposing ends of the ring of filter media, the first and second end caps defining first and second openings, respectively, the second opening adapted to receive the standpipe when the fuel filter cartridge is inserted into the filter housing;

a seal carried by the second end cap surrounding the second opening, the seal adapted to engage and seal against the standpipe when the fuel filter cartridge is inserted into the filter housing;

a lid adapted to be mounted to the filter housing, the lid having a central hub projecting axially into the first opening, the hub having an enlarged end extending radially beyond the central opening for engaging the first end cap to retain the tubular filter element to the lid, the lid further comprising a valve actuating projection unitary with the lid projecting axially within the hub, the valve actuating projection adapted to actuate the fuel valve when the fuel filter cartridge is installed on the filter housing; and a strainer assembly comprising a strainer basket and a ring seal for straining fuel flowing from one of said two ports to a third port of the filter housing, the strainer basket comprising a cylindrical cage extending axially between first and second ends, the cylindrical cage supporting a cylindrical strainer liner extending between first and second ends, the first end including a radially inward projecting flange sandwiched between the lid and the tubular filter element for retention of the strainer basket, the ring seal provided at the second end and adapted to engage the bowl.

21. The fuel filter cartridge of claim 20 further comprising means for aligning the strainer basket concentrically relative to the lid, said means comprising interlocking ribs and slots between the lid and the first end of the strainer basket.

* * * * *

UNITED STATES PATENT AND TRADEMARK OFFICE
CERTIFICATE OF CORRECTION

PATENT NO. : 6,607,665 B2
DATED : August 19, 2003
INVENTOR(S) : Walter J. Fick et al.

It is certified that error appears in the above-identified patent and that said Letters Patent is hereby corrected as shown below:

Column 8,
Lines 4-5, after "the tubular hub is a", delete ","
Lines 25-26, after "the first opening", delete "that excludes any axial slots formed there through"
Line 28, after "the central opening", insert -- that excludes any axial slots formed there through, --
Line 31, after "wherein the hub is a", delete ","

Column 10,
Line 55, after "wherein the tubular hub is a", delete ","

Signed and Sealed this

Twenty-fifth Day of November, 2003

JAMES E. ROGAN
*Director of the United States Patent and Trademark Office*